United States Patent [19]

White et al.

[11] Patent Number: 5,191,022

[45] Date of Patent: Mar. 2, 1993

[54] COVULCANIZABLE POLYMER BLENDS AND PROCESS FOR PRODUCING THE SAME

[75] Inventors: Donald A. White, Edison; Stanley J. Brois, Westfield, both of N.J.; Bruce D. Allison, Terre Haute, Ind.

[73] Assignee: Exxon Chemical Patents Inc., Linden, N.J.

[21] Appl. No.: 491,140

[22] Filed: Mar. 9, 1990

[51] Int. Cl.⁵ .................. C08L 23/36; C08L 7/00; C08L 9/00; C08L 23/32
[52] U.S. Cl. .................. 525/237; 525/211; 525/331.8; 525/194; 525/192
[58] Field of Search .................. 525/237, 211, 331.8, 525/194

[56] References Cited

U.S. PATENT DOCUMENTS

| | | | |
|---|---|---|---|
| 3,897,405 | 7/1975 | Son et al. | 525/331.8 |
| 3,915,907 | 10/1975 | Hopper | 260/5 |
| 3,970,133 | 7/1976 | Hopper | 152/353 R |
| 4,772,406 | 9/1988 | Brois | 252/47.5 |
| 4,867,753 | 9/1989 | Brois | 44/71 |

OTHER PUBLICATIONS

A. Y. Coran, Abstract, "Blends of Dissimilar Rubbers—Cure-Rate Incompatibility", Rubbercon 1987.

*Primary Examiner*—Carman J. Seccuro, Jr.
*Attorney, Agent, or Firm*—M. L. Gibbons; J. E. Schneider

[57] ABSTRACT

A covulcanizable polymer blend of a highly unsaturated rubbery polymer and a sulfer imide-modified teropolymer of ethylene, a higher alpha olefin and a non-conjugated diene is provided. Processes for preparing the blend and vulcanizing the blend are also provided.

18 Claims, 1 Drawing Sheet

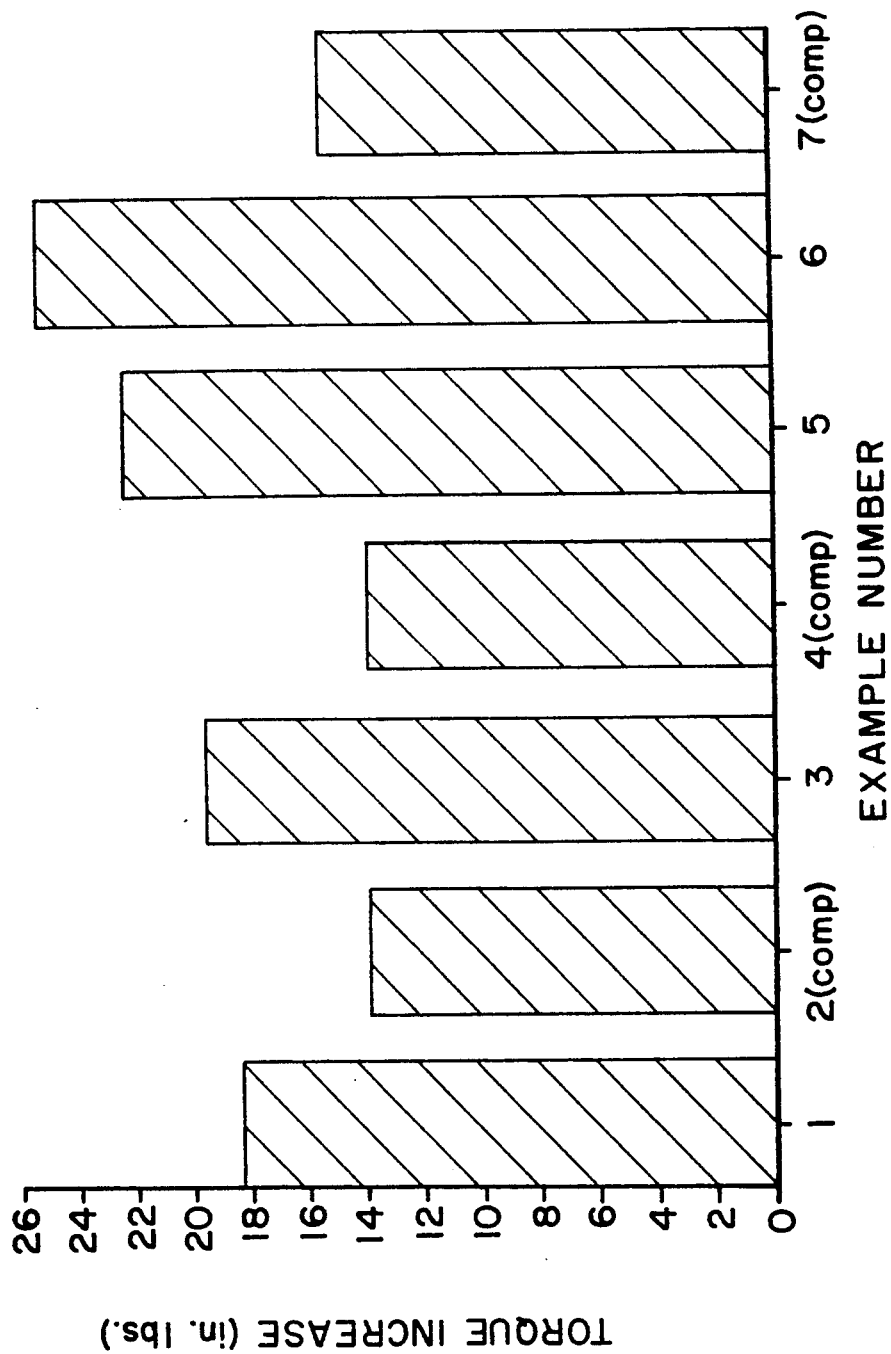

COVULCANIZABLE POLYMER BLENDS AND PROCESS FOR PRODUCING THE SAME

BACKGROUND OF THE INVENTION

1. Field of the Invention

The present invention relates to covulcanizable polymer blends of a sulfur imide-modified terpolymer and a highly unsaturated rubbery polymer.

2. Description of Information Disclosures

Sulfur imide-modified low unsaturation terpolymers of ethylene, a higher alpha olefin and a non-conjugated diene and processes for their preparation are disclosed in U.S. Pat. Nos. 4,772,406 and 4,867,753, the teachings of which are hereby incorporated by reference.

Highly unsaturated rubbery polymers are also known and commercially available.

Mixtures of chlorothiosulfonamide-modified rubbery terpolymers having a low degree of unsaturation and a highly unsaturated rubbery polymer and vulcanizates of such mixtures are also known. See, for example, U.S. Pat. No. 3,915,907 and U.S. Pat. No. 3,970,133.

Mixtures of maleic anhydride-modified low unsaturation terpolymers and a highly unsaturated rubbery polymer are also known. See, for example, A. Y. Coran, *Abstracts Rubbercon* 1987, Harrogate, UK, p. 32A/1.

Blends of low unsaturation rubbery polymers with highly unsaturated rubbery polymers are desirable since they would incorporate the properties of both types of rubbery polymers. The advantages of incorporating low unsaturation rubbery terpolymers into compositions of high unsaturation rubbery polymers are known to provide improved ozone resistance to the vulcanized blend. However, low unsaturation rubbery polymers, such as, for example, elastomeric terpolymers of ethylene, propylene, and a non-conjugated diene vulcanize at a slower rate than the highly unsaturated rubbers and, therefore, attempts to covulcanize such blends may yield heterogeneous dispersions of a poorly cured or uncured low unsaturation rubber in a well cured highly unsaturated rubber and preclude the use of such blends in articles subjected to severe service requirements such as tires.

It has now been found that a blend of a sulfur imide-modified elastomeric terpolymer having a low level of unsaturation and a highly unsaturated rubbery polymer can be covulcanized (i.e., co-cured) to produce a vulcanized blend having improved properties.

BRIEF DESCRIPTION OF THE DRAWING

The sole FIGURE is a graph showing the results of an oscillating disk rheometer test of the products of the examples.

SUMMARY OF THE INVENTION

In accordance with the invention, there is provided a vulcanizable composition comprising: (a) at least one sulfur imide-modified terpolymer of ethylene, a higher alpha olefin, and a non-conjugated diene, and (b) at least one highly unsaturated rubbery polymer.

In accordance with the invention, there is also provided a process for producing a vulcanizable composition which comprises the step of: mixing (a) at least one sulfur imide modified terpolymer of ethylene, a higher alpha olefin, and a non-conjugated diene, with (b) at least one highly unsaturated rubbery polymer.

The term "higher alpha olefin" is used herein to denote an alpha olefin having a higher molecular weight than ethylene.

DETAILED DESCRIPTION OF THE INVENTION

The vulcanizable composition of the present invention comprises a blend or mixture of a sulfur imide modified terpolymer having a low level of unsaturation and a rubbery polymer having a high level of unsaturation.

A. The Sulfur Imide-Modified Terpolymer

Sulfur imide-modified terpolymers suitable as a component of the vulcanizable composition of the present invention are reaction products of a sulfur imide and a terpolymer of ethylene, a higher alpha olefin, and a non-conjugated diene.

Sulfur Mono and Diimides

The sulfur imide reactant used to form the modified terpolymer for use in the present invention may be a sulfur monoimide, a sulfur diimide, and mixtures thereof which are unsaturated, polar nitrogen- and sulfur containing organic reactants. They will generally include carbon, hydrogen, nitrogen, sulfur, and oxygen, and will contain at least one sulfur atom double-bonded to at least one nitrogen atom, and must also contain an electron withdrawing group in sufficient proximity to the nitrogen-sulfur double-bond such that at least one nitrogen-sulfur double bond is activated towards reaction with the olefinic unsaturation in the hydrocarbon monomer or polymer.

The preferred unsaturated, polar nitrogen- and sulfur-containing reactants are heterocumulenes having the formula:

$$X{=}S{=}N{-}Y$$

wherein , $S{=}$, or $Y'{-}N{=}$, and in which $-Y$ and $Y'-$ are the same or different and comprise electron withdrawing groups having a substituent group, such as substituted carbonyls, $-C(O)R'$, substituted sulfonyls, $-S(O_2)R''$, substituted phosphoryls, $-P-(O)(R''')(R'''')$, represented by

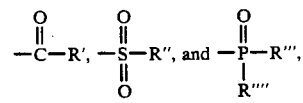

wherein $R'$ is selected from the group consisting of hydrocarbyl and hydrocarbyloxy, $R''$ is hydrocarbyl, and $R'''$ and $R''''$ are independently hydrocarbyloxy, and each of $R'$, $R''$, $R'''$, and $R''''$ includes from 1 to 20 carbon atoms. The exact constituency and structure of $R'$, $R''$, $R'''$, or $R''''$ is not critical, and any constituent structure thereof which does not create steric hindrance, and which does not decrease the electron withdrawing properties of the $-Y$ and $Y'-$ groups sufficiently to prevent the reaction with the double bond will be effective for this invention.

Thus, the substituent $R'$ or $R''$ can be any substituted or non-substituted aliphatic (linear or branched), aromatic, cycloaliphatic, or heterocyclic group, and although the substituent group will normally be saturated, some non-ethylenic unsaturation may be tolerated, for example, 1 to 2 unsaturated bonds per substituent group. Such unsaturation will be one or more of carbon to hetero-atom or hetero-atom to hetero-atom bonds, for example, ketoic, carboxylic, thioic, sulfonic, sulfuric, imidic, etc.

Aliphatic substituent groups can include the straight or branched alkyl chains such as methyl, ethyl, nonyl, octadecyl, and the like. Examples of such groups include 2-ethyl-hexyl, 2,2,4-trimethyl pentyl, 2,6,10,14-tetramethyl pentadecyl, etc. Specific examples of the sulfur imides include N,N'-diacetyl sulfur diimide. N,N'-di(methyl sulfonyl)sulfur diimide, N,N'-dibutyryl sulfur diimide, N,N'-di(butyl sulfonyl) sulfur diimide. N,N'-di(2-ethyl-hexanoyl) sulfur diimide, N,N'-di(2-ethylhexyl sulfonyl) sulfur diimide, N,N'-di-octadecanoyl sulfur diimide, N,N'-di(octadecyl sulfonyl) sulfur diimide, and the equivalent mono- and unsymmetrically substituted mono- and diimides.

Aromatic substituents, which may be heteroatom-containing (e.g., nitrogen) aromatic substituents, include those having one or more hydrocarbyl or heteroatom-containing hydrocarbyl groups substituted for a hydrogen attached to a ring carbon. Such substitution can be at one or more of the ortho, meta or para positions. Specific examples of such substituents include phenyl, tolyl, xylyl, 2,4,6-trimethyl pyridyl, 2(4-butyl) pyridyl, and 2(4-decyl) pyridyl. Specific such compounds include N,N'-dibenzoyl sulfur diimide, bis nicotinoyl sulfur diimide, N-sulfinyl benzamide, N-sulfinyl-p-toluene sulfonamide, N,N'-bis-p-toluene sulfonyl sulfur diimide, N,N'-bis (4-hexadecyl phenyl sulfonyl) sulfur diimide. Again, the sulfur diimides may be unsymmetrically substituted with any of the radicals listed above. Such an unsymmetrical sulfur diimide is exemplified by N-benzoyl-N'-carbethoxy sulfur diimide.

Particularly useful examples of the —R', —R''' and —R'''', group include hydrocarbyloxy groups, such as aliphatic groups having an —O— atom attached directly to the electron-withdrawing group —C(O)—, i.e., alkoxy substituents. Specific examples of compounds so comprised include N-sulfinyl methyl carbamate, N-sulfinyl-2-ethylhexyl carbamate, N-sulfinyl-N-octadecyl carbamate, N,N'-dicarbethoxy sulfur diimide, N,N'-biscarbodecyloxy sulfur diimide, N,N'-biscarboctadecyloxy sulfur diimide, N,N'-biscarbo-2-ethyldecyloxy sulfur diimide, or any mono- or dicarboalkoxy sulfur diimide where the mono- or dicarboalkoxy groups contain one to about 18 carbon atoms. The sulfur diimides may contain one hydrocarbyloxy substituent as well as a different hydrocarbyloxy or another of the above-described substituents, e.g., N-nicotinoyl-N'-carboctadecyloxy sulfur diimide. The dialkyl phosphoro (sulfinyl amidates) such as diethyl phosphoro (sulfinyl amidate) are another specific group of compounds having hydrocarbyloxy substituents and thus having utility in accordance with this invention.

Aryloxy —R', R''' and R'''' substituents include the aromatic substituents described above attached to the —O— atom which is directly attached to the carbon atom of the electron-withdrawing group —C(O)—. Specific examples of these compounds include N-sulfinyl-phenyl carbamate, N-sulfinyl-4-butyl phenyl carbamate, N-sulfinyl-3-pyridylcarbamate, bis(carbophenoxy) sulfur diimide, bis(carbo-4-octadecyl phenoxy) sulfur diimide, bis(carbo-4-heptyl-2-pyridyloxy) sulfur diimide, and compounds produced by the unsymmetrical substitution on the sulfur diimide radical of these substituents, or mixed with those substituents in the preceding paragraphs.

Preparations of the sulfur mono-imide and diimides are well known, see for example, Journal of Organic Chemical (1983), pages 3561–3564, and form no part of this invention.

The Unmodified Terpolymer

Unmodified terpolymers suitable to react with the sulfur imides to produce the sulfur imide terpolymer component of the vulcanizable composition of the present invention include terpolymers of ethylene, at least one higher alpha olefin, and at least one non-conjugated diene. The unmodified terpolymer is generally substantially amorphous and can have a substantially random arrangement of at least the ethylene and the higher alpha olefin monomers.

The unmodified terpolymer will generally have a weight average molecular weight (Mw) in the range between about 10,000 and 1,000,000 or higher, typically between about 15,000 and 500,000, and more typically between about 20,000 and 350,000.

Typically, the unmodified terpolymer is "substantially amorphous," and when that term is used to define the unmodified terpolymer, it is to be taken to mean having a degree of crystallinity less than about 25 percent, preferably less than about 15 percent, and more preferably less than about 10 percent as measured by means known in the art. However, it should also be recognized that unmodified terpolymers which contain higher levels of crystallinity, and, therefore, are other than substantially amorphous can also be used.

The unmodified terpolymer useful as reactant with the sulfur imide for the practice of the present invention will contain about 20 to about 90 weight percent ethylene, preferably about 30 to 85 weight percent ethylene, and even more preferably about 35 to about 80 weight percent ethylene.

The higher alpha-olefins suitable for use in the preparation of the unmodified terpolymer are preferably $C_3$–$C_{16}$ alpha-olefins. Illustrative non-limiting examples of such alpha-olefins are propylene, 1-butene, 1-pentene, 1-hexene, 1-octene, and 1-dodecene. The alpha-olefin content of the terpolymer prior to modification is generally about 10 to about 80 weight percent, preferably about 20 to about 70 weight percent. The preferred alpha-olefin for the purposes of this invention is propylene.

The non-conjugated dienes suitable for use in the preparation of the unmodified terpolymer include dienes having from 6 to 15 carbon atoms. Such diene monomers are selected from polymerizable dienes. Representative examples of suitable non-conjugated dienes that may be used to prepare the unmodified terpolymer include:

a. Straight chain acyclic dienes such as: 1,4-hexadiene; 1,5-heptadiene; 1,6-octadiene.
b. Branched chain acyclic dienes such as: 5-methyl-1,4-hexadiene ; 3,7-dimethyl 1,6-octadiene, and 3,7-dimethyl 1,7-octadiene.
c. Single ring alicyclic dienes such as: 4-vinylcyclohexene; 1-allyl, 4-isopropylidene cyclohexane; 3-allyl-cyclopentene; 4-allyl cyclohexene; and 1-isopropenyl-4-butenyl cyclohexane.
d. Multi ring alicyclic fused and bridged ring dienes such as: dicyclopentadiene; alkenyl, alkylidene, cycloalkenyl and cycloalkylidene norbornenes such as: 5-methylene-2-norbornene 5-methylene-6-methyl-2-norbornene; 5-methylene-6, 6-dimethyl- 2-norbornene; 5-propenyl-2-norbornene; 5-(3-cyclopentenyl)-2-norbornene; 5-ethylidene-2-norbornene; and 5-cyclohexylidene-2-norbornene, etc.

The preferred dienes are selected from the group consisting of 1,4-hexadiene; dicyclopentadiene; 5-ethylidene-2-norbornene; 5-methylene-2-norbornene; and mixtures thereof.

The total diene monomer content in the unmodified terpolymer may suitably range from about 0.1 to about 15 weight percent, preferably 0.5 to about 12 weight percent, and most preferably about 1.0 to about 6.0 weight percent. In those instances where a combination of dienes is used, the preferred diene should comprise at least about 20 percent of the diene present in the polymer, preferably at least about 40 percent, most preferably at least about 60 percent, for example at least about 75 percent.

Preparations of unmodified terpolymers ethylene, a higher alpha olefin and a non-conjugated diene of the type described above are well known and form no part of this invention. The unmodified terpolymers are commercially available.

B. The Highly Unsaturated Rubbery Polymer

By the term "highly unsaturated" rubbery polymer is intended herein a polymer comprising at least about 5 mole percent of a conjugated diene monomer component, such as, for example, butadiene, isoprene, and piperylene. Representative examples of highly unsaturated rubbery polymers include cis-1,4, polyisoprene natural rubber; synthetic cis-1,4,-polyisoprene; polybutadiene; butadiene-styrene copolymer; butadiene-acrylonitrile copolymer; butadiene-acrylonitrile-acrylate terpolymers; etc., and mixtures thereof.

The weight ratio of sulfur imide modified terpolymer to the highly unsaturated rubbery polymer in the blend of the present invention may suitably range from about 10:1 to about 0.1:1, preferably from about 5:1 to about 0.2:1.

Process for Producing the Vulcanizable Composition and the Vulcanized Composite The vulcanizable composition of the present invention is produced by mixing a sulfur imide-modified terpolymer of ethylene, a higher alpha olefin and a non-conjugated diene of the type previously described with a highly unsaturated rubbery polymer of the type previously described. Mixing may be performed at a temperature ranging from about 0 to 200° C., preferably from about 50 to 150° C. The pressure is not critical and may vary widely. The mixing may be performed in a suitable mixing apparatus such as a rubber mill or an internal mixer and may be carried out batch wise or as a continuous mixing process, e.g., Banbury ®, Brabender ® or extruder type. The resulting polymer mixture or blend is a covulcanizable (i.e., cocurable) composition. If desired, known additives, such as carbon black, clays, silica, carbonates, oils, resins, and the like, may be compounded into said vulcanizable composition.

The vulcanizable composition is subjected to a vulcanization step at vulcanization conditions in the presence of a vulcanizing agent.

In a preferred embodiment, the vulcanizing agent and other optional additives such as accelerators, prevulcanization inhibitors, antioxidants, fillers, softeners and process aids may be incorporated into the vulcanizable composition by mixing at a temperature sufficiently low to prevent vulcanization from occurring. For conventionally used vulcanizing agents, the mixing temperature is preferably less than about 110° C. Mixing of the vulcanizable composition with the vulcanizing agents and, optionally, with other additives may be carried out advantageously on a rubber mill or in internal mixers, for example, a Banbury ® mixer, a Brabender ® mixer, or extruder type mixers.

Vulcanization of the vulcanizable composition is conducted by subjecting the vulcanizable composition into which vulcanizing agents and optionally other additives have been mixed to vulcanization conditions. Suitable vulcanization conditions include a temperature ranging from about 110° C. to about 250° C., preferably from about 125° C. to about 200° C. and a time period ranging from about 1 to about 150 minutes, preferably from about 5 to about 50 minutes. The vulcanization may be performed under static conditions, for example, in an autoclave, oven or press, etc., or under dynamic conditions, for example, in an internal mixer. When the vulcanization is carried out under dynamic conditions, both the mixing of vulcanizing agents and optional other additives into the vulcanization composition and the vulcanization step may be performed in the same equipment. Such a combined mixing and vulcanization process may suitably be carried out in an extruder type mixer.

The preferred vulcanizing agents are those which are effective to vulcanize simultaneously the sulfur imide modified terpolymer of ethylene, a higher alpha olefin and a non-conjugated diene and the highly unsaturated rubbery polymer. The vulcanization behavior of the sulfur imide modified terpolymer is assumed to be similar to that of the unmodified terpolymer. Therefore, the preferred vulcanizing agents are those which are effective with both the terpolymers of ethylene, a higher alpha olefin and a non-conjugated diene, and with the highly unsaturated rubbery polymer. Suitable vulcanizing agents can be selected from handbooks, such as "Rubber Technology Handbook", by W. Hofmann, published by HANSER VERLAG, Munich, West Germany, 1989. The most preferred vulcanizing agent is elemental sulfur, which is an effective vulcanizing agent for both the terpolymers of ethylene, a higher alpha olefin and a non-conjugated diene and highly unsaturated rubbery polymers, such as natural rubber, polybutadiene, polyisoprene, and styrene-butadiene and acrylonitrile-butadiene copolymers. Peroxide vulcanizing agents may be useful when the highly unsaturated rubbery polymer is an acrylonitrile-butadiene copolymer.

The following examples are presented to illustrate the invention. Unless otherwise indicated, all parts and percentages are by weight.

The low unsaturation rubbery terpolymers used as reactants with the sulfur imides in the following examples were as follows:

Polymer A: a terpolymer comprising 49% ethylene; 3.7% 1,4-hexadiene, and the balance being propylene. Polymer A had a Mooney Viscosity, (ML 1+4) at 100° C. of 35.

Polymer B: a terpolymer comprising 50% ethylene; 2.3% of 5-ethylidene-2-norbornene, and the balance being propylene. Polymer B had a Mooney Viscosity, (ML 1+4) at 25° C. of 34.

Polymer C: a terpolymer of 52% ethylene; 5.0 % of 5-ethylidene-2-norbornene, and the balance being propylene. Polymer C had a Mooney Viscosity, (ML 1+4) at 125° C. of 33.

EXAMPLE 1

Polymer A was chemically modified as follows:

Thirty grams of Polymer A were heated to 150° C. in a Brabender ® mixer. Ethoxycarbonyl sulfur imide ($C_2H_5OCO-N=S=N-COOC_2H_5$), in an amount of 1.2 grams (5.8 moles), was added to the mixer. The mixing was continued for five minutes. The resulting sulfur imide-chemically modified terpolymer was removed from the Brabender ® mixer and combined with four other batches of similarly prepared material.

The modified terpolymer, hereinafter designated Polymer D, was mixed with a highly unsaturated rubbery polymer, namely, polyisoprene to produce a polymer blend. The blend was evaluated using an oscillating disk rheometer. The results are shown in the Table and in the FIGURE. The blend of Example 1 is a blend in accordance with the present invention.

COMPARATIVE EXAMPLE 2

The cocurability of unmodified Polymer A with polyisoprene was evaluated using an oscillating disk rheometer. Results are shown in the Table and in the FIGURE. The weight ratio of unmodified Polymer A to polyisoprene in Comparative Example 2 was the same as the weight ratio of sulfur imide modified Polymer A to polyisoprene in Example 1.

EXAMPLE 3

Polymer B was chemically modified as follows:

Thirty grams of Polymer B were heated to 110 to 120° C. in a Brabender ® mixer. Ethoxycarbonyl sulfur diimide ($C_2H_5OCO-N=S=N-COOC_2H_5$), in an amount of 1.2 grams (5.8 moles), was added to the mixer. The mixing was continued for five minutes. The sulfur imide chemically-modified terpolymer (hereinafter designated Polymer E) was removed from the Brabender mixer and combined with four other batches of similarly prepared material.

Polymer E was mixed with a highly unsaturated rubbery polymer, namely, polyisoprene. The blend was evaluated using an oscillating disk rheometer. Results are shown in the Table and in the FIGURE. The blend of this example is a blend in accordance with the present invention.

COMPARATIVE EXAMPLE 4

The cocurability of unmodified Polymer B with polyisoprene was evaluated using an oscillating disk rheometer. Results are shown in the Table and in the FIGURE. The weight ratio of unmodified Polymer B to polyisoprene in Comparative Example 4 was the same as the weight ratio of sulfur imide modified Polymer E to polyisoprene in Example 3.

EXAMPLE 5

Polymer C was modified as follows:

Two hundred and fifty grams of Polymer C were heated to 125° C. in a 300 ml Brabender ® mixer. Bisphenylsulfonyl sulfur diimide (in an amount of 30 moles as a solution in the minimum volume of toluene) was added to the mixer. The mixing was continued for six minutes.

The resulting polymer, hereinafter designated Polymer F, was blended with polyisoprene using an oscillating disk rheometer. The results are shown in the Table and in the FIGURE. The polymer blend of this example is a blend in accordance with the present invention.

EXAMPLE 6

This example was conducted in the same manner as Example 5, except that as sulfur imide reactant, phenylsulfonyl thionyl imide ($PhSO_2=N=S=O$) was used in an amount of 30 moles as a solution in toluene. The modified Polymer C resulting from this reaction is designated herein as Polymer G.

Polymer G was blended with polyisoprene. The blend was evaluated using an oscillating disk rheometer. Results are shown in the Table and in the FIGURE. The polymer blend of Example 6 is a blend in accordance with the present invention.

COMPARATIVE EXAMPLE 7

The cocurability of unmodified Polymer C with polyisoprene was evaluated using an oscillating disk rheometer. Results are shown in the Table and in the FIGURE. The weight ratio of unmodified Polymer C to polyisoprene in Comparative Example 7 was the same as the weight ratios of Polymer F or Polymer G to polyisoprene in Examples 5 and 6, respectively.

As can be seen from the data shown in the Table, the rheometer test in which the polymer blends of the present invention were used, namely, Examples 1, 3, 5, and 6 gave a substantially larger torque increase on curing these blends. This is an indication of cocurability of the polymer blends.

TABLE

OSCILLATING DISK RHEOMETER TEST RESULTS

1. BANBURY ® BATCH

| | |
|---|---|
| Sample | 149 g |
| (1) Natsyn ® 2200 | 60 g |
| N-550 carbon black | 100 g |

The above components were mixed for four minutes or until the temperatures reached about 132° C. to 144° C. (270° F. to 290° F.).

2. MILL MIX

| | |
|---|---|
| Banbury ® batch | 154.5 g |
| (2) Wingstay ® T | 1.0 g |
| zinc oxide | 4.0 g |
| sulfur | 1.5 g |
| (3) Morfax ® | 1.0 g |
| Stearic acid | 2.2 g |
| (4) TMTDS | 0.05 g |

Footnotes
(1) = synthetic polyisoprene
(2) = butylated octyl phenol
(3) = 2-(4-morpholinodithio) benzothiazole
(4) = tetramethylthiuram disulfide The above components were mixed on a rubber mill such that the temperature did not exceed the range of 104° C. to 110° C. (220 to 230° F.).

The mill mix was used as the sample for the rheometer.

3. RHEOMETER SETTINGS 1 degree arc, 60 minutes times range, 100 in. lbs. torque range, 100 cycles, standard die and 150° C.

4. RESULTS

| EXAMPLE | MAXIMUM TORQUE (in. lbs) | MINIMUM TORQUE (in. lbs) | TORQUE INCREASE (in. lbs) | T90 (min) | T4 (min) |
|---|---|---|---|---|---|
| 1 | 24.2 | 5.9 | 18.3 | 15.5 | 8.8 |
| 2 (comparative) | 20.0 | 6.1 | 13.9 | 7.9 | 5.0 |
| 3 | 28.0 | 8.5 | 19.5 | 22.7 | 12.0 |
| 4 | 21.0 | 7.0 | 14.0 | 9.3 | 5.8 |

| (comparative) | | | | | |
|---|---|---|---|---|---|
| 5 | 29.0 | 6.7 | 22.3 | 26.1 | 4.0 |
| 6 | 31.8 | 6.4 | 25.4 | 28.6 | 3.8 |
| 7 (comparative) | 26.0 | 10.5 | 15.5 | 23.4 | 5.3 |

T90 = time to reach 90% of maximum torque.
T4 = time for 4 point torque increase above minimum.

What is claimed is:

1. A vulcanizable composition comprising: (a) at least on sulfur diimide-modified terpolymer of ethylene, a higher alpha olefin, and an non-conjugated diene, (b) at least one highly unsaturated rubbery polymer and a vulcanizing agent, said sulfur diimide represented by the formula:

$$Y'-N=S=N-Y$$

wherein Y and Y' are independently selected from the group consisting of $$-\overset{O}{\underset{\|}{C}}-R'; \quad -\overset{O}{\underset{\|}{S}}-R''; \text{ and } -\overset{O}{\underset{\underset{R''''}{|}}{\overset{\|}{P}}}-R'''$$

wherein R' is selected from the group consisting of hydrocarbyl and hydrocaryloxy, R" comprises a hydrocarbyl substituent, and R'" and R"" are independently selected from hydrocarboyloxy and where each R', R", R'" and R"" comprise from 1 to 20 carbon atoms.

2. The vulcanized composition of claim 1,

3. The vulcanizable composition of claim 1 wherein Y and Y' each comprise:

$$-\overset{O}{\underset{\|}{C}}-R'.$$

4. The vulcanizable composition of claim 1 wherein said sulfur diimide is selected from the group consisting of ethoxycarbonyl sulfur diimide, phenyl sulfonyl sulfur diimide and mixtures thereof.

5. The vulcanizable composition of claim 1 wherein said higher alpha olefin comprises from 3 to 16 carbon atoms and said non-conjugated diene is selected from the group consisting of 1,4-hexadiene; dicyclopentadiene; 5-ethylidene-2-norbornene; 5-methylene-2-norbornene, and mixtures thereof.

6. The vulcanizable composition of claim 1 wherein said terpolymer is a terpolymer of ethylene, propylene, and 5-ethylidene-2-norbornene.

7. The vulcanizable composition of claim 1 wherein said highly unsaturated rubber is selected from the group consisting of cis-1,4-polyisoprene natural rubber; synthetic cis-1,4 polyisoprene, polybutadiene, butadiene-styrene copolymer; butadiene-acrylonitrile copolymer; and mixtures thereof.

8. The vulcanizable composition of claim 1 wherein the weight ratio of said sulfur diimide-modified terpolymer to said highly unsaturated rubbery polymer ranges from about 10:1 to 0.01:1.

9. A process for producing a vulcanizable composition which comprises the step of: mixing (a) at least one sulfur diimide-modified terpolymer of ethylene, a higher alpha olefin and a non-conjugated diene, with (b) at least one highly unsaturated rubbery polymer and a vulcanizing agent, said sulfur diimide represented by the formula:

$$Y'-N=S=N-Y,$$

wherein Y and Y' are independently selected from the group consisting of $$-\overset{O}{\underset{\|}{C}}-R'; \quad -\overset{O}{\underset{\|}{S}}-R''; \text{ and } -\overset{O}{\underset{\underset{R''''}{|}}{\overset{\|}{P}}}-R'''$$

wherein R' is selected from the group consisting of hydrocarbyl and hydrocaryloxy, R" comprises a hydrocarbyl substituent, and R'" and R"" are independently selected from hydrocarboyloxy and where each R', R", R'" and R"" comprise from 1 to 20 carbon atoms.

10. In the process of claim 9, the additional step of vulcanizing said composition at vulcanization conditions, in the presence of a vulcanizing agent, to produce a vulcanized composition.

11. The process of claim 10, wherein said vulcanizing agent is sulfur.

12. The process of claim 11, wherein said vulcanizing conditions include a temperature ranging from about 100 to about 250° C.

13. The process of claim 9, wherein the weight ration of said sulfur diimide-modified terpolymer to said highly unsaturated rubbery polymer ranges from about 10:1 to 0.1:1.

14. The process of claim 9 wherein Y and Y' each comprise:

$$-\overset{O}{\underset{\|}{C}}-R'.$$

15. The process of claim 9 wherein said sulfur diimide is selected from the group consisting of ethoxycarbonyl sulfurdiimide, phenylsulfonyl sulfurdiimide and mixtures thereof.

16. The process of claim 9 wherein said higher alpha olefin comprises from 3 to 16 carbon atoms and wherein said non-conjugated diene is selected from the group consisting of 1,4-hexadiene; dicyclopentadiene; 5-ethylidene-2-norbornene; 5-methylene-2-norbornene; and mixtures thereof.

17. The process of claim 9 wherein said terpolymer is a terpolymer of ethylene, propylene and 5-ethylidene-2-norbornene.

18. The process of claim 9 wherein said highly saturated rubbery polymer is selected from the group consisting of cis-1,4 polyisoprene natural rubber; synthetic cis-1, 4 polyisoprene, polybutadiene; butadiene-styrene copolymer; and mixtures thereof.

* * * * *